United States Patent
Yin et al.

(10) Patent No.: US 8,042,730 B2
(45) Date of Patent: Oct. 25, 2011

(54) FOOD MENU HAVING ELECTRONIC LABELS

(75) Inventors: Wen Cheng Yin, Taipei County (TW); Ho-Chuan Hsu, Kaohsiung County (TW)

(73) Assignee: Taiwan Name Plate Co., Ltd., Taoyuan County (TW)

( * ) Notice: Subject to any disclaimer, the term of this patent is extended or adjusted under 35 U.S.C. 154(b) by 791 days.

(21) Appl. No.: 12/149,966

(22) Filed: May 12, 2008

(65) Prior Publication Data
US 2009/0194581 A1     Aug. 6, 2009

(30) Foreign Application Priority Data

Feb. 1, 2008   (TW) ................................ 97104076 A

(51) Int. Cl.
*G06K 7/10* (2006.01)

(52) U.S. Cl. .................................. 235/375; 235/462.01

(58) Field of Classification Search .................. 235/375, 235/454, 462.01, 472.01, 472.02, 472.03
See application file for complete search history.

(56) References Cited

U.S. PATENT DOCUMENTS

| | | | | |
|---|---|---|---|---|
| 7,548,635 | B2 * | 6/2009 | Kojima | 382/112 |
| 2005/0242958 | A1 * | 11/2005 | Lyon et al. | 340/572.7 |
| 2008/0203173 | A1 * | 8/2008 | Baba | 235/492 |
| 2009/0085751 | A1 * | 4/2009 | Sakama et al. | 340/572.7 |
| 2009/0295567 | A1 * | 12/2009 | Bellows | 340/539.11 |
| 2009/0321529 | A1 * | 12/2009 | Jesme et al. | 235/492 |
| 2010/0007465 | A1 * | 1/2010 | Benedict | 340/10.1 |

* cited by examiner

*Primary Examiner* — Thien M Le
(74) *Attorney, Agent, or Firm* — Bacon & Thomas, PLLC

(57) ABSTRACT

A food menu having electronic labels is disclosed. The food menu comprises at least one ordering page and at least one electronic label. Each ordering page has at least one product data. The electronic label is installed on the ordering page, and each electronic label includes an IC data, a first sensing unit, a second sensing unit and a fixed pad. The IC data is corresponding to the product data. The fixed pad is provided for fixing the first sensing unit and the second sensing unit, and enabling the first sensing unit to rotate. When the customer rotates the first sensing unit till the first sensing section of the first sensing unit corresponds to the second sensing section of the second sensing unit, the electronic label is triggered to generate a sensing signal for transmitting the IC data of the product so as to select the product data corresponding thereto.

24 Claims, 9 Drawing Sheets

FOOD MENU HAVING ELECTRONIC LABELS

BACKGROUND OF THE INVENTION (a) Field of the Invention

The present invention relates to technology of the Radio Frequency Identification (RFID), and more particularly to a food menu having electronic labels based on the RFID technology.

(b) Description of the Prior Art

Traditionally, when the customer proceeds to order in the restaurants, the service personnel writes the desired ordering, such as the name, the quantity and the flavor of the ordered, by hand on the order slip, then the order slip is delivered to the kitchen, this is not only time-consuming and laborious but also easy to make mistakes. Once the order slips are lost carelessly or miswritten by service personnel resulted in out-of-order service, thereby may cause the customer's complaints, and further influence the business due by reduced number of customers.

Additionally, a conventional portable food menu mentioned is disclosed in which the electronic label is associated with each dish inside the food menu page, meanwhile, the service personnel are equipped with a portable sensing device. After the customer tells the service personnel what he/she would like to order, the service personnel takes order for customers by the radio portable sensing device to display the dish information, such as dish name, on the display interface of the portable sensing device. Such information is thus transmitted from the local area network of the restaurant to the server, and then transmitted to the kitchen for the further serving procedure. Lastly, the ordered food is placed on the customer's table.

However, the drawback of the conventional portable food menu lies in that the service personnel has to provide assistance to the customer for ordering, for example, as the customer wants to order the dish listed on the first page or any other pages, the service personnel has to use the portable sensing device to instantly sense that dish's electronic labels on the food menu. This ordering method is not only labor-consuming, but also imperceptibly prolongs the operation procedure for serving the food to customers in the restaurant.

In view of the drawbacks of the prior art, the inventor of the present invention based on years of experience in the related industry to conduct extensive researches and experiments, and finally developed a food menu having electronic labels in accordance with the present invention to overcome the aforementioned drawbacks.

SUMMARY OF THE INVENTION

The objective of the present invention is to provide a food menu having electronic labels. The customer himself/herself can operate and rotate the electronic labels of the food menu when ordering. By the knob design on the electronic label, either the customer or service personnel can use the portable sensing device to wirelessly sense the electronic label of the ordering. When the restaurant is occupied and the service personnel can neither manage the service quality nor take the ordering well, thereby providing convenient access to both food menu and portable sensing device, such that the customer can complete the ordering operation in an efficient manner, to optimize the ordering efficacy and serving speed at the minimal expense associated with the service personnel.

To achieve the foregoing objective, the present invention provides a food menu having electronic labels. The food menu comprises at least one ordering page and at least one electronic label. Each ordering page contains at least one product data, and the electronic label is installed on the ordering page. Each electronic label includes an IC data, a first sensing unit, a second sensing unit and a fixed pad. The IC data is corresponding to the product data. The fixed pad is provided for fixing the first sensing unit and the second sensing unit, and enabling the first sensing unit to rotate. When the customer rotates the first sensing unit till the first sensing section of the first sensing unit corresponds to the second sensing section of the second sensing unit, the electronic label is triggered to generate a sensing signal for transmitting the IC data of the product so as to select the product data corresponding thereto.

Preferably, the food menu can further comprise a menu cover which is to provide for wrapping and stabilizing the ordering page, and the electronic label emerges from an outer layer of the menu cover.

Preferably, the electronic label can further comprise a chip, a top cap and a bottom cap. The chip is for storing the IC data, the top cap is disposed on the top side of the electronic label and the bottom cap is disposed on the bottom side of the electronic label.

Preferably, the electronic label can display the IC data on one display interface of the portable sensing device by a portable sensing device which is applied for sensing the IC data.

BRIEF DESCRIPTION OF THE DRAWINGS

The subject matter regarded as the invention is particularly pointed out and distinctly claimed in the concluding portion of the specification. The invention with features and advantages thereof may best be understood by reference to the following detailed description with the accompanying drawings in which:

DETAILED DESCRIPTION OF THE PREFERRED EMBODIMENTS

Figure 1:
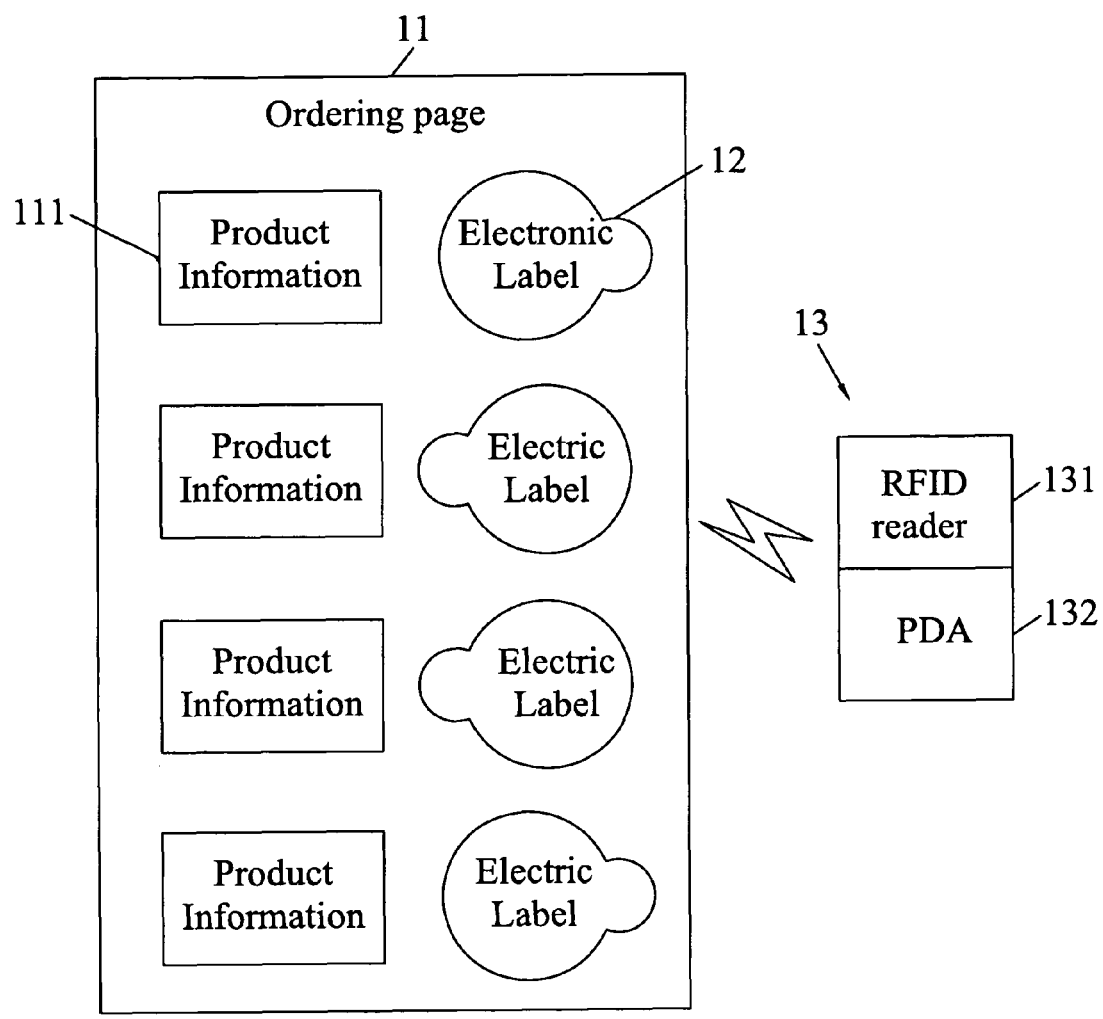
FIG. 1 is a schematic view showing a food menu having electronic labels in accordance with the present invention.
Figure 2A:
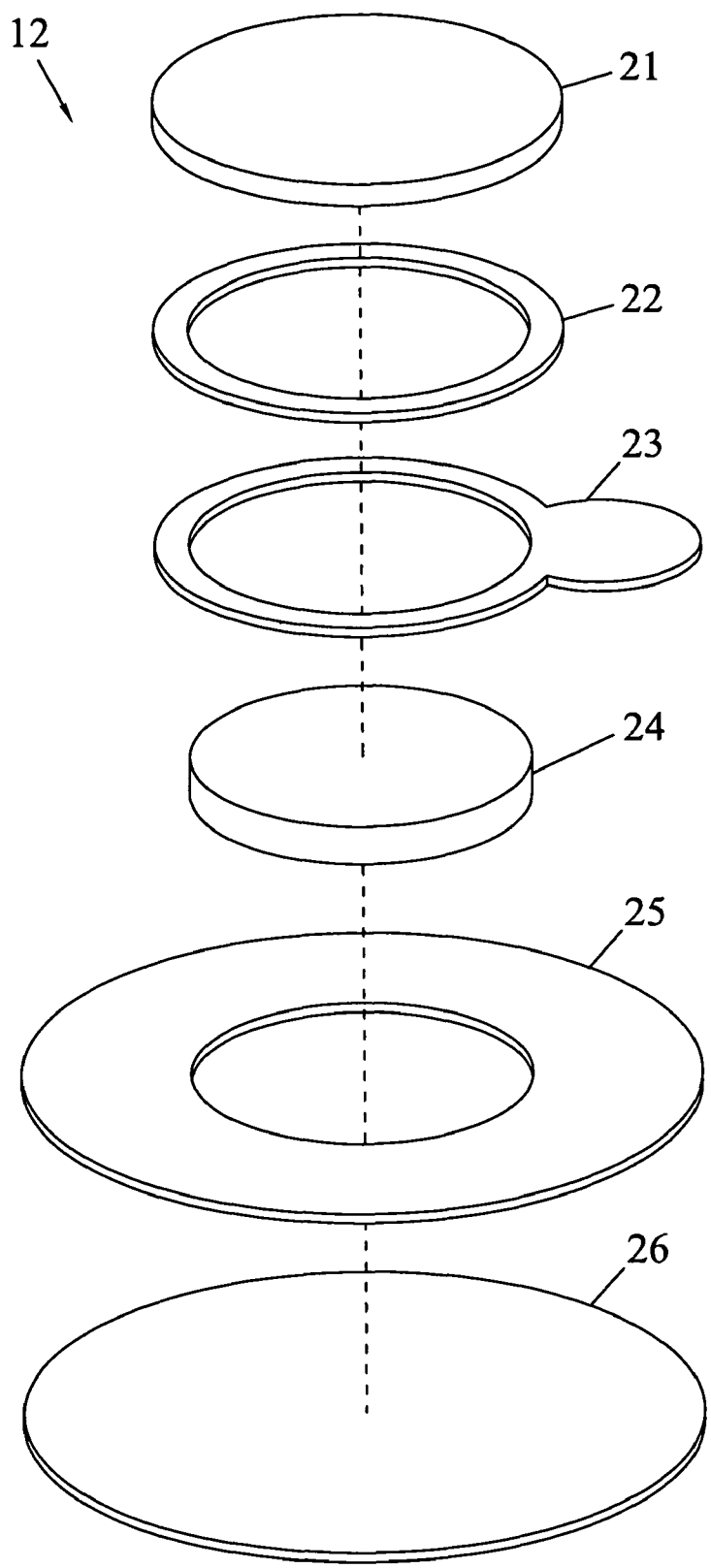
FIG. 2A is a part breakdown drawing showing the electronic label o in accordance with the present invention.
Figure 2B:
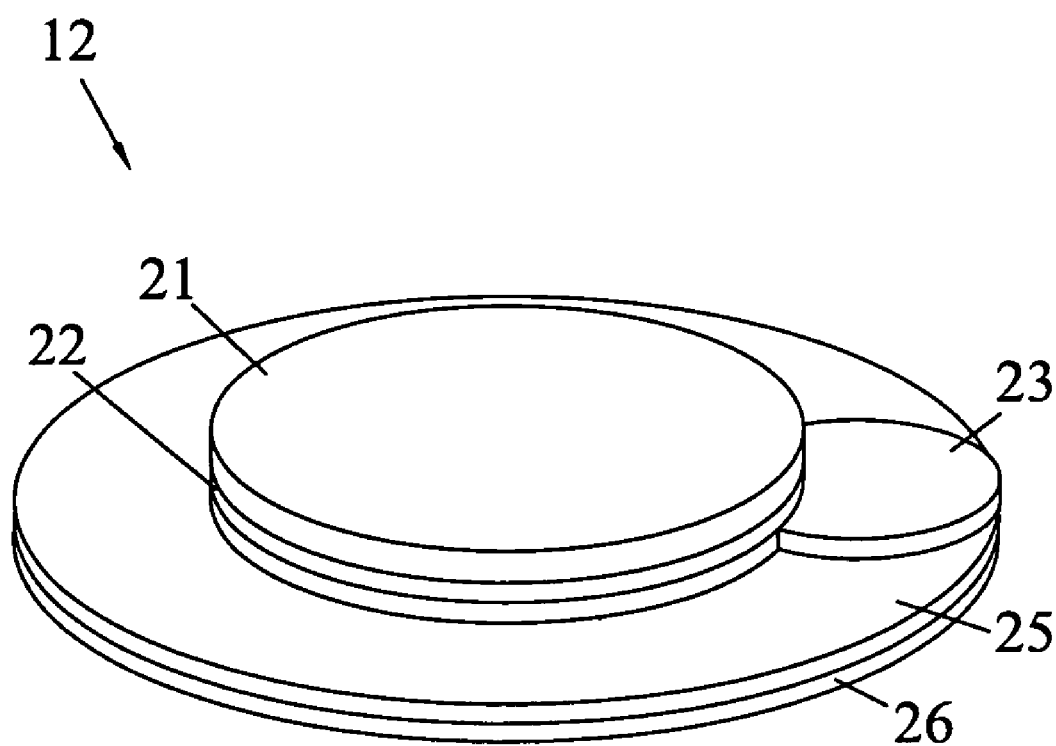
FIG. 2B is a part assembly drawing showing the electronic label in accordance with the present invention.

Referring to FIG. 1, FIG. 2A and FIG. 2B, FIG. 1 shows a schematic view of a food menu having electronic labels in accordance with the present invention, and FIG. 2A shows a part breakdown drawing of the electronic label in accordance with the present invention, and FIG. 2B shows a part assembly drawing of the electronic label in accordance with the present invention. The food menu chiefly comprises at least one ordering page 11 and at least one electronic label 12, and further comprises a menu cover (not shown). There is at least one product data 111 on each ordering page 11. Each product data 111 includes at least one of a photograph, a name, an ingredient, a flavor and a price for a dish associated therewith.

Furthermore, the electronic label 12 is installed on the ordering page 11. Each electronic label 12 includes an IC data (not shown), a first sensing unit, a second sensing unit and a fixed pad 24. The IC data is corresponding to the product data 111. The product data 111 includes at least one of a photograph, a name, an ingredient, a flavor and a price for a dish associated therewith. The fixed pad 24 is to provide fixing the first sensing unit and the second sensing unit, and enabling the first sensing unit to be rotated. Preferably, the material of the fixed pad 24 is non-conducting material and the fixed pad 24 is one of a pin or an elastic fragment.

Each electronic label 12 further comprises a top cap 21, a bottom cap 26 and a chip, in which the top cap 21 is disposed on the top side of the electronic label 12, the bottom cap 26 is disposed on the bottom side of the electronic label 12, and the chip is provided for storing the IC data.

When the customer rotates the first sensing unit from 0 degree to 360 degree till the first sensing section corresponds to the second sensing section of the second sensing unit, it indicates that the customer chooses the product data 111, by which the electronic label 12 is triggered to generate a sensing signal for transmitting the IC data corresponding to the product data 111.

Otherwise, when the customer rotates the first sensing unit from 0 degree to 360 degree but the first sensing section does not correspond to the second sensing section, it indicates that the customer does not choose the product data 111 corresponding to the IC data so the electronic label does 12 not generate the sensing signal to transmit the IC data and the product data 111 corresponding thereto.

Preferably, the first sensing unit above-mentioned can be the cannular rotary loop 23, and the first sensing section can be an antenna coil, a non-shielding section, a brush or a frequency control section. Preferably, the second sensing unit can be the first plate 22 or the second cap 25, and the second sensing section can be a non-shielding section, an antenna coil or the junction of the chip.

Besides, the electronic label 12 transmits a Radio Frequency Identification signal to sense the IC data based on a radio transmit/receive mechanism provided by the portable sensing device, and the sensed IC data is displayed on the display interface of the portable sensing device 13. Preferably, the portable sensing device can be a Radio Frequency Identification (RFID) reader 131 integrated with a personal digital assistant 132 (PDA).

Additionally, the menu cover is to provide for wrapping and stabilizing the ordering page 11, and the electronic label 12 emerges from an outer layer of the menu cover. Thus, the service personnel or the customer can finish sensing all the electronic labels 12 with the portable sensing to speed up the procedure for ordering.

Figure 3A:
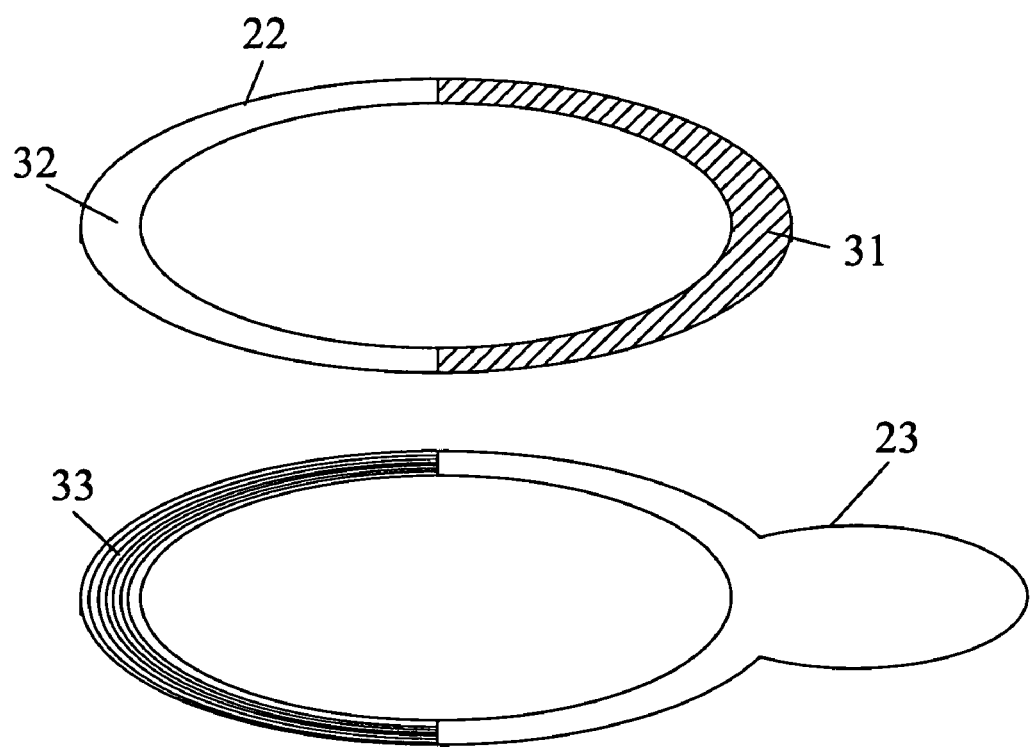
FIG. 3A is a schematic view showing the first operation of the electronic label in accordance with the present invention.
Figure 3B:
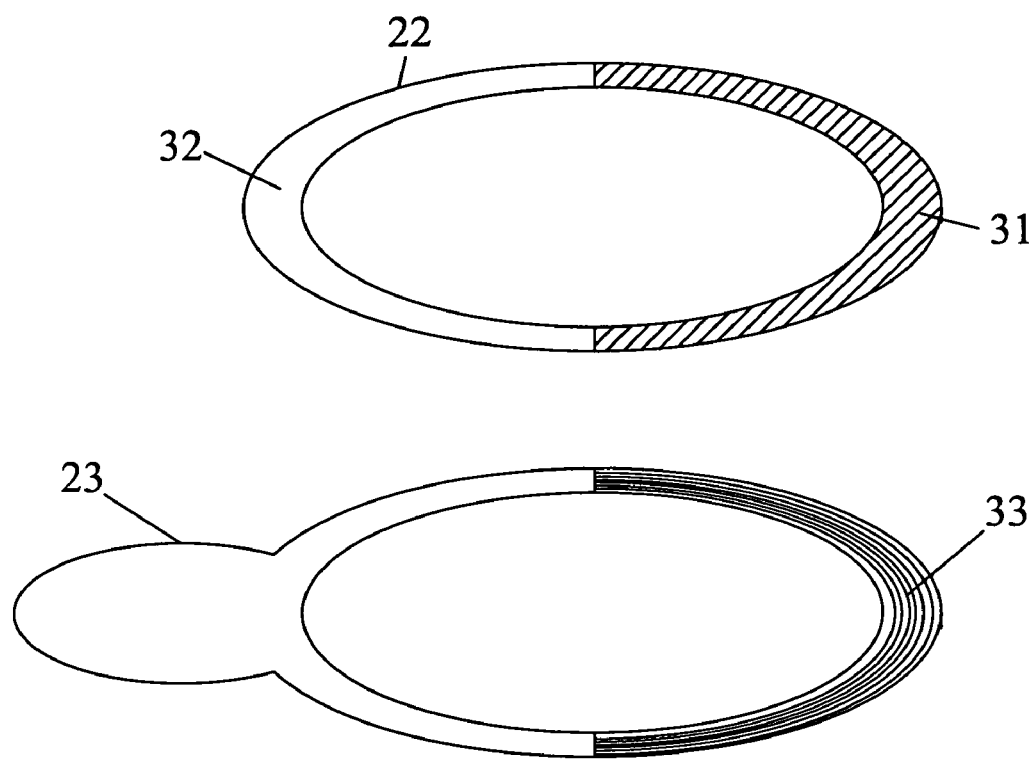
FIG. 3B is a schematic view showing the first operation of the electronic label in accordance with the present invention.

Referring to FIG. 3A and FIG. 3B for the schematic views of the first operation way of the electronic label in accordance with the present invention, and the first operation way is performed on the food menu having electronic labels shown in FIG. 1, and corresponds to the electronic label shown in FIG. 2A and FIG. 2B.

The first sensing unit of the electronic label 12 in FIG. 2A can be a cannular rotary loop 23, the first sensing section can be an antenna coil 33 or a non-shielding section 32, the second sensing unit can be a first plate 22, and the second sensing section can be an antenna coil 33 or a non-shielding section 32. In another word, the cannular rotary loop 23 is provided with one of the antenna coil 33 or the non-shielding section 32, and the first plate 22 is provided with the other one of the antenna coil 33 or the non-shielding section 32.

The antenna coil 33 is usually disposed on the section of the cannular rotary loop 23. The material of the antenna coil 33 is composed of the conductive sliver and the antenna coil 33 can be formed either by printing means or etching means. The first plate 22 is provided with a shielding section 31 preventing the antenna coil 33 from being sensed by the radio frequency identification signal with a portable sensing device 13. The shielding section 31 is preferably a metal sheet.

When the customer rotates the cannular rotary loop 23 from 0 degree to 360 degree till the non-shielding section 32 corresponds to the antenna coil 33, it indicates that the customer chooses the product data 111 corresponding to the IC data, the portable sensing device 13 can senses the IC data of the chip without metal shielding effect formed by the non-shielding section 32 and the antenna coil 33, and then the relative product data of the IC data is displayed on the display interface of the portable sensing device 13.

Otherwise, when the customer rotates the cannular rotary loop 23 from 0 degree to 360 degree such that the shielding section 31 corresponds to the antenna coil 33, it indicates that the customer does not choose the product data corresponding to the IC data, the metal shielding effect is formed by the shielding section 31 and the antenna coil 33 to prevent the portable sensing device 13 from transmitting the radio frequency identification signal and from sensing the IC data of the chip.

The metal shielding effect is applied to the electronic label 12 of the present invention. When the restaurant is filled to capacity and the staff is unavailable at the same time, besides using the sensing system to assist the customer in simplifying the procedure for ordering, the food menu having electronic labels connected with the portable sensing device is also applied in order to manage well both service quality and the efficiency for ordering.

Figure 4A:
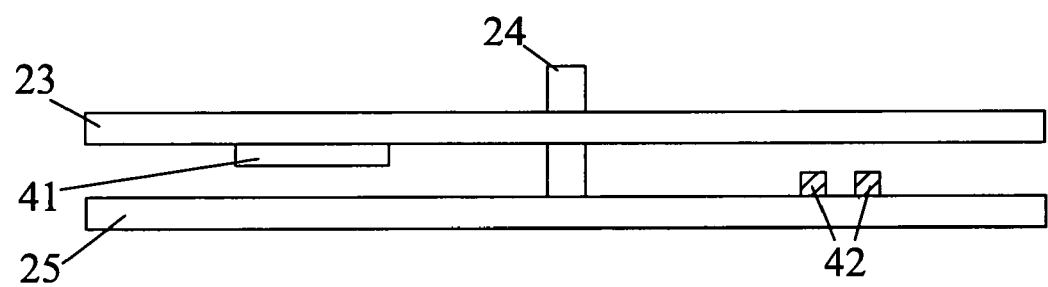
FIG. 4A is a schematic view showing the second operation of the electronic label in accordance with the present invention.
Figure 4B:
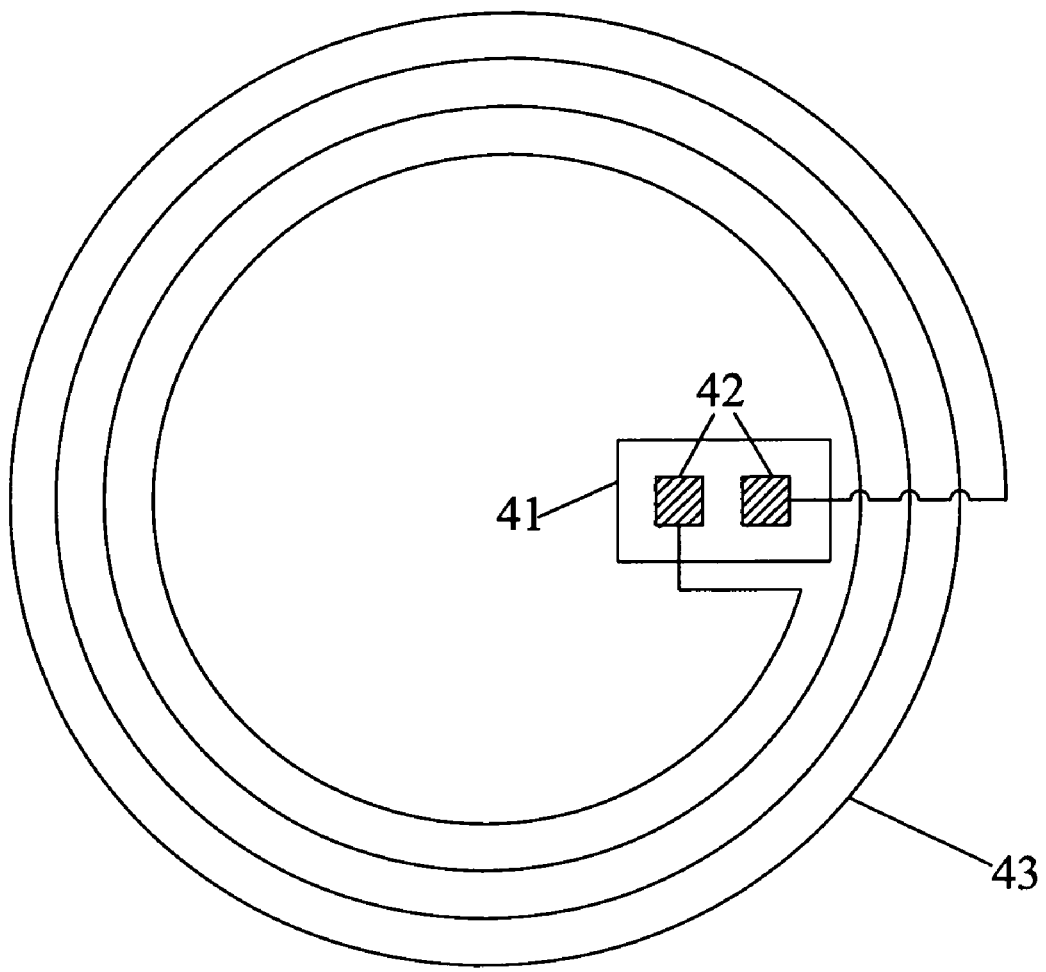
FIG. 4B is a schematic view showing the second operation of the electronic label in accordance with the present invention.
Figure 4C:
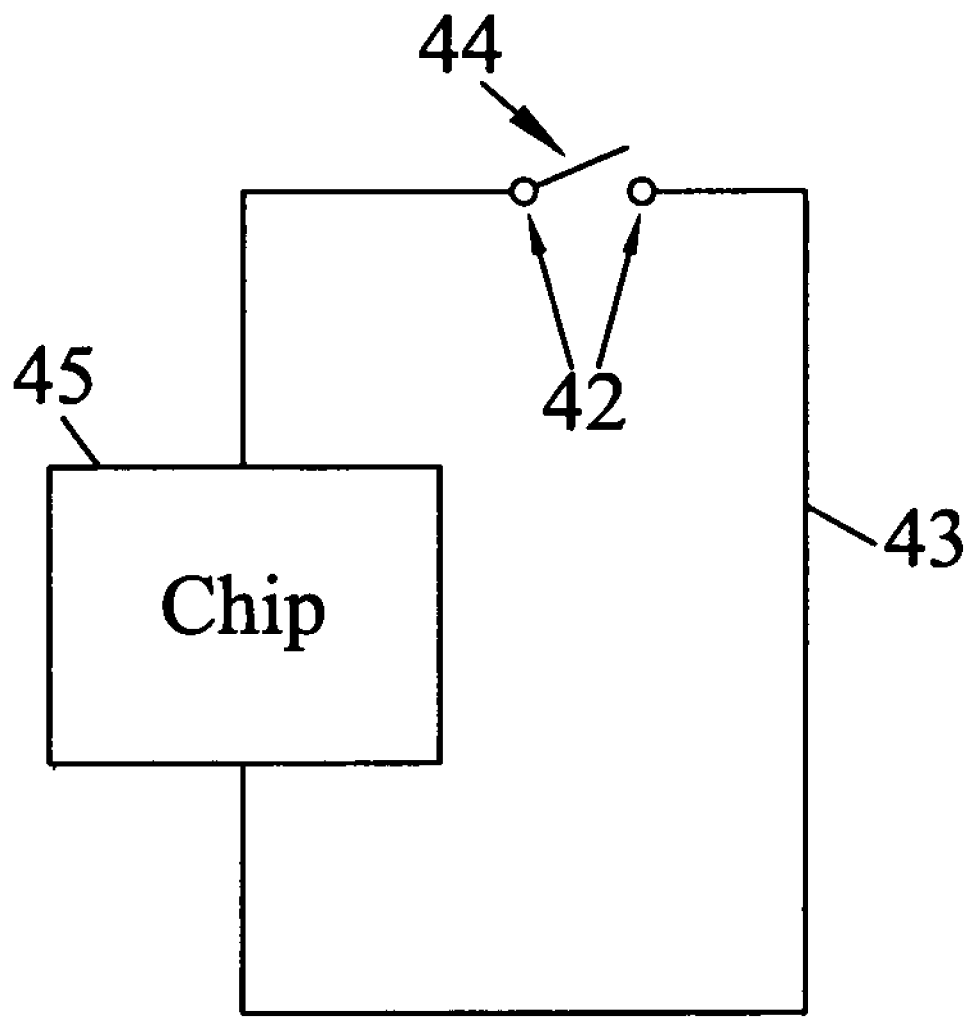
FIG. 4C is a schematic view showing the second operation of the electronic label in accordance with the present invention.

Please refer to FIG. 4A, FIG. 4B and FIG. 4C for schematic views showing the second operation way of the electronic label in accordance with the present invention, it makes use of the food menu having electronic labels shown by FIG. 1 and also corresponds to the electronic label shown by FIG. 2A and FIG. 2B. As shown by FIG. 2A for the electronic label 12, the first sensing unit is the cannular rotary loop 23, the first sensing section is the brush 41, the second sensing unit is the second cap 25 and the second sensing section is the junction of the chip 42. As well as, the cannular rotary loop is provided with the brush 41 and the second cap 25 is provided with the junction of the chip 42.

The brush 41 is located at the lower side of the cannular rotary loop 23, and a material of brush 41 is a conductive silver pulp and is formed either by printing, evaporating or sputtered means. The second cap 25 is provided with an antenna coil 43, the material of antenna coil is the conductive silver pulp, and is formed either by printing or etching means.

When the customer rotates the cannular rotary loop 23 from 0 degree to 360 degree till the brush 41 corresponds to the junction of the chip 42, it indicates that the customer chooses the product data 111 corresponding to the IC data that resulted in the brush 41 contacting with the junction of the chip 42 to form a contact switch 44, i.e. a loop contact switch, used to conduct the antenna coil 43 to enable the radio frequency identification signal transmitted from the portable sensing device 13 to sense the IC data of the chip 45.

Otherwise, when the customer rotates the cannular rotary loop from 0 degree to 360 degree such that the brush 41 is not in contact with the junction of the chip 42, it indicates that the customer does not choose the product data 111 corresponding to the IC data, so the brush 41 does not contact the junction of the chip to form the contact switch 44 that resulted in the antenna coil 43 is not conducted. Therefore, the IC data of chip 45 can not be sensed by the radio frequency identification signal transmitted from the portable sensing device 13.

By using the contact switch 44 of the electronic label 12 of the present invention, the customer can just rotate each cannular rotary loop 23 to proper position to indicate his/her choice, and then the service personnel can read the ordering information fast from the electronic label 12 related to the product by the portable sensing device 13. In the event, the procedure for providing food can be finished efficiently by the kitchen related personnel.

Figure 5:
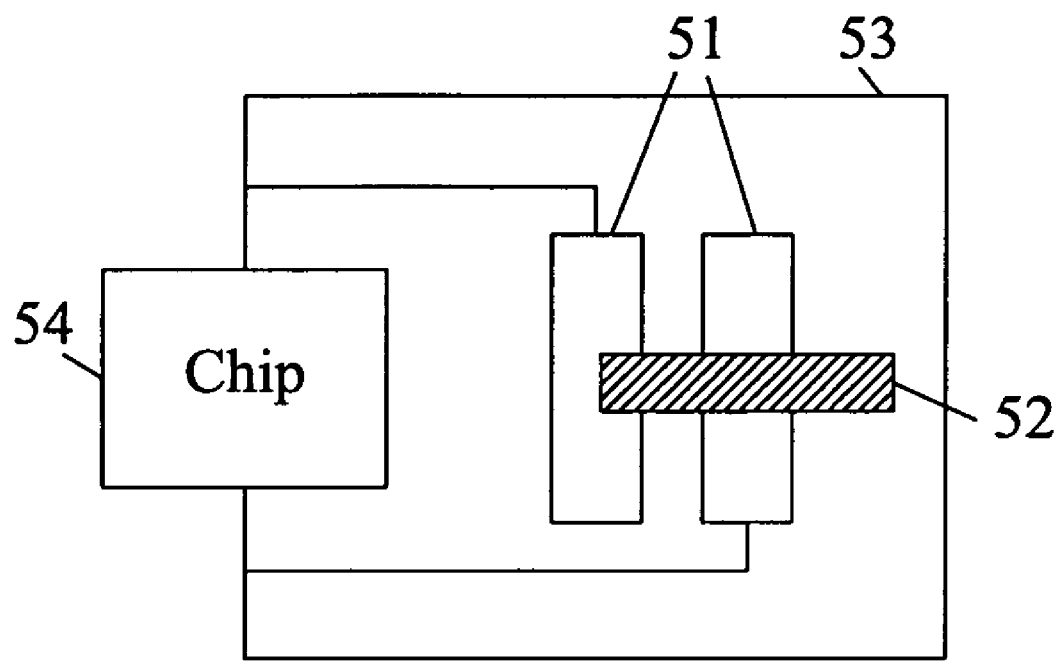
FIG. 5 is a schematic view showing the third operation of the electronic label in accordance with the present invention.

Please refer to the FIG. 5 for the schematic view showing the third operation of the electronic label in accordance with the present invention, it applies to the food menu having electronic labels shown by FIG. 1 and corresponds to the electronic label shown by FIG. 2A and FIG. 2B. As shown by the electronic label 12 of FIG. 2A, the first sensing unit is a cannular rotary loop 23, the first sensing section is a frequency control section 52, the second sensing unit is a second cap 25 and the second sensing section is a junction of the chip 51. Also, the cannular rotary loop is provided with the frequency control section 52 and the second cap 25 is provided with the junction of the chip 51.

The material of the frequency control section composed of the conductive metal is formed by a printing method. The second cap 25 is provided with an antenna coil 53 which is coupled to generate a resonant frequency and contacted to the junction of the chip 51. Also, the material of the antenna coil 53 composed of the conductive sliver is formed by printing means or etching means.

To achieve the best coupling effect for the antenna coil 53, and enable the portable sensing device 13 to sense the antenna coil 53 of the electronic label 12 for accurately reading the IC data of the chip 54, the resonant frequency of the antenna coil 53 has to be adjusted near to the sensing frequency of the portable sensing device. By way of controlling the contacting area that the frequency control section 52 touched with the junction of the chip 51, the value of the resonant frequency can be adjusted, and the resonant frequency of the antenna coil 53 can be adjusted from range between 10 MHz and 18 MHz, to 13.56 MHz area of the sensing frequency of the portable sensing device 13.

When the customer rotates the cannular rotary loop 23 from 0 degree to 360 degree such that the frequency control section is in contact with the junction of the chip 51, it indicates that the customer chooses the product data 111 corresponding to the IC data, that resulted in conducting the antenna coil 53 to enable the radio frequency identification signal transmitted from the portable sensing device 13 to sense the IC data of the chip 54. As a result, the relative product data of the IC data is displayed on the display interface of the portable sensing device 13.

Otherwise, when the customer rotates the cannular rotary loop 23 from 0 degree to 360 degree such that the frequency control section 52 is not in contact with the junction of the chip 42, it indicates that the customer does not choose the product data 111 corresponding to the IC data, so the antenna coil 53 is not conducted. Therefore, the IC data of chip 54 can not be sensed by the radio frequency identification signal transmitted from the portable sensing device 13.

The way to control the value of resonant frequency provided by the present invention can enable the portable sensing device 13 to sense the IC data of the chip 54 accurately and also can promote the efficiency of procedure for ordering and providing food.

It is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

What is claimed is:

1. A food menu having electronic labels comprising:
   at least one ordering page and each ordering page containing at least one product data; and
   at least one electronic label installed on said ordering page, and each electronic label having an IC data, a fixed pad, a first sensing unit and a second sensing unit, and said IC data corresponding to said product data respectively, and said fixed pad provided for fixing said first sensing unit and said second sensing unit, and enabling the first sensing unit to rotate;
   wherein when said first sensing unit is rotated till the first sensing section of said first sensing unit corresponds to the second sensing section of said second sensing unit, said electronic label is triggered to generate a sensing signal for transmitting said IC data to select the product data corresponding thereto.

2. The food menu of claim 1, wherein said food menu further comprises a menu cover which is provided for wrapping and stabilizing said ordering page.

3. The food menu of claim 2, wherein said electronic label emerges from an outer layer of said menu cover.

4. The food menu of claim 1, wherein said product data or said IC data contains at least one of a photograph, a name, an ingredient, a flavor and a price, of a dish associated there.

5. The food menu of claim 1, wherein said electronic label transmits a Radio Frequency Identification signal to sense said IC data based on a radio transmit/receive mechanism provided by a portable sensing device, and said IC data is displayed on a display interface of said portable sensing device.

6. The food menu of claim 5, wherein said portable sensing device is a Radio Frequency Identification (RFID) reader integrated with a personal digital assistant (PDA).

7. The food menu of claim 1, wherein said electronic label further comprises a chip provided for storing said IC data.

8. The food menu of claim 1, wherein the material of said fixed pad is non-conducting material and said fixed pad is one of a pin or an elastic fragment.

9. The food menu of claim 1, wherein said electronic label further comprises a top cap and a bottom cap, in which said top cap is disposed on the top side of said electronic label and said bottom cap is disposed on the bottom side of said electronic label.

10. The food menu of claim 1, wherein said first sensing unit is a cannular rotary loop, and said first sensing section is an antenna coil, and said second sensing unit is a first plate, and the second sensing section is a non-shielding section.

11. The food menu of claim 10, wherein said cannular rotary loop can be rotated from 0 degree to 360 degree to enable said antenna coil corresponding to said non-shielding section.

12. The food menu of claim 10, wherein said antenna coil is located at a part section of said cannular rotary loop.

13. The food menu of claim 10, wherein the material of said antenna coil is a conductive sliver pulp and said antenna coil is formed either by printing means or etching means.

14. The food menu of claim 10, wherein said first plate is provided with a shielding section for preventing said antenna coil from being sensed by a radio frequency identification signal.

15. The food menu of claim 1, wherein said first sensing unit is a cannular rotary loop, said first sensing section is a brush, said second sensing unit is a second plate and said second sensing section is a junction of said chip.

16. The food menu of claim 15, wherein said cannular rotary loop can be rotated from 0 degree to 360 degree to enable said brush contacting the junction of said chip to form a contact switch.

17. The food menu of claim 16, wherein said contact switch is a loop contact switch.

18. The food menu of claim 15, wherein a material of said brush is a conductive sliver, and said brush is formed either by printing means, evaporating means or sputtered means.

19. The food menu of claim 1, wherein said first sensing unit is a cannular loop, and said first sensing section is a frequency control section, said second sensing unit is a second plate and said second sensing section is a junction of said chip.

20. The food menu of claim 19, wherein a material of said frequency control section is a conductive metal material and said frequency control section is formed by printing means.

21. The food menu of claim 19, wherein said second plate is provided with an antenna coil, to which the antenna coil is coupled for generating a resonant frequency and is contacted with said junction of said chip.

22. The food menu of claim 21, wherein said resonant frequency is within a range between 10 MHz and 18 MHz.

23. The food menu of claim 21, wherein the value of said resonant frequency is controlled by a contacting area that said frequency control section touched with said junction of the chip.

24. The food menu of claim 19, wherein said electronic label senses said IC data by a portable sensing device, and one of the frequency of said portable sensing device is 13.56 MHz.

* * * * *